Nov. 30, 1954     O. MEYER     2,695,446
METHOD OF MAKING TUBE-TO-FLANGE CONNECTION
Filed June 12, 1951     2 Sheets-Sheet 1
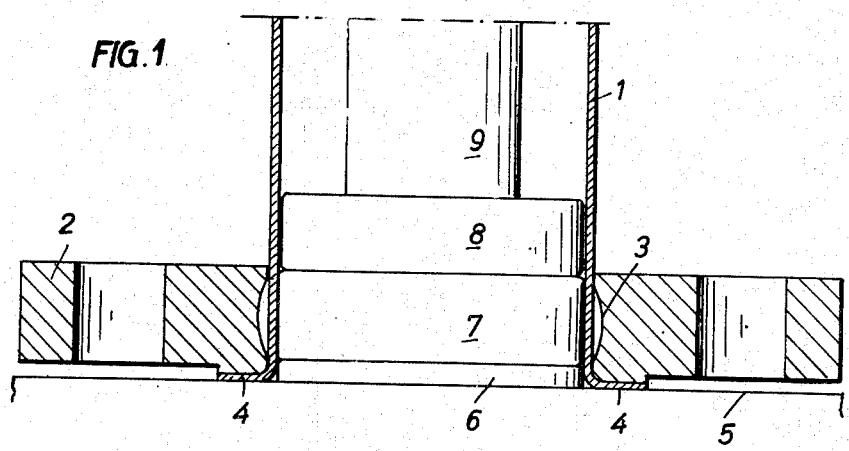
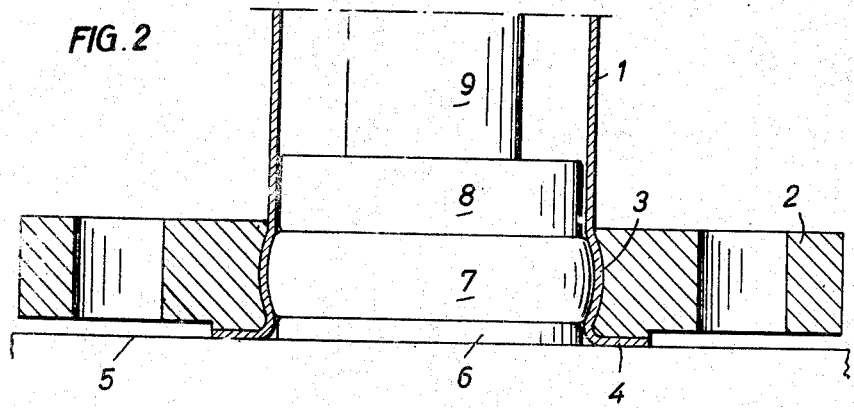
INVENTOR:
Otto Meyer Nov. 30, 1954   O. MEYER   2,695,446
METHOD OF MAKING TUBE-TO-FLANGE CONNECTION
Filed June 12, 1951   2 Sheets-Sheet 2
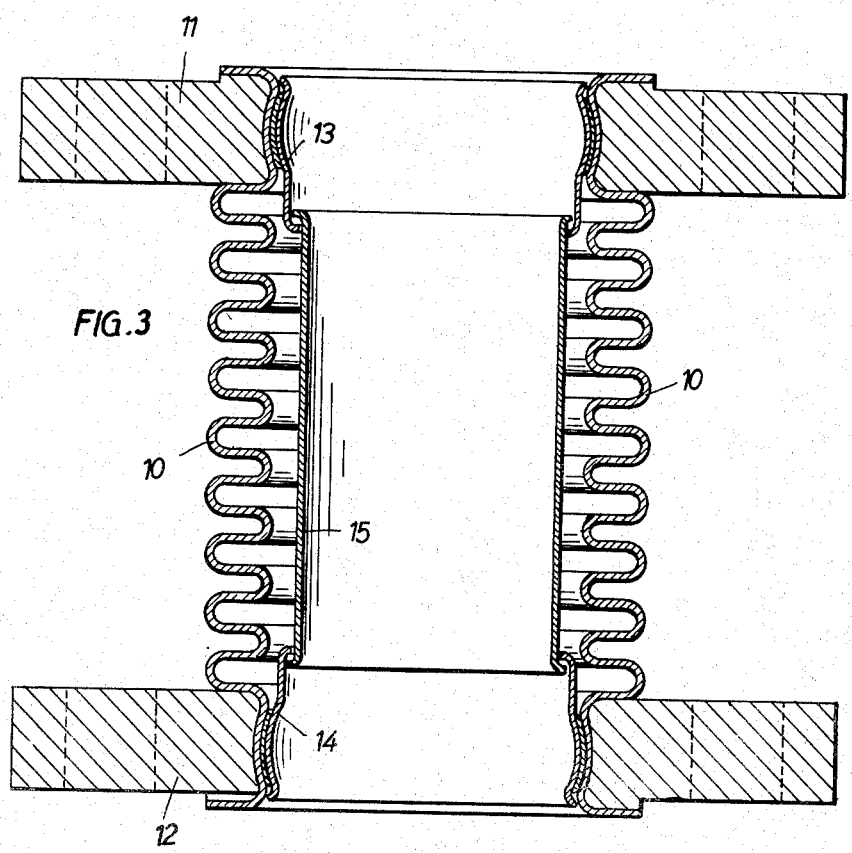
INVENTOR:
Otto Meyer

United States Patent Office 2,695,446
Patented Nov. 30, 1954

2,695,446
METHOD OF MAKING TUBE-TO-FLANGE CONNECTION

Otto Meyer, Lucerne, Switzerland, assignor to Metallschlauchfabrik A. G., Lucerne, Switzerland Application June 12, 1951, Serial No. 231,085

Claims priority, application Switzerland June 30, 1950

2 Claims. (Cl. 29—523)

My present invention relates generally to a method of interconnecting at least two hollow metal bodies of widely different wall thicknesses and particularly to a method of positively interconnecting a metal tube to a metal flange for tube-joining purposes.

In many cases where a hollow metallic body, such as a metal tube having an extremely thin wall, has to be connected in a heatproof relation to a hollow metallic body having a relatively thick wall, such as a flange, autogenous welding cannot be applied on account of the imminent risk of burning up the tube. In such cases, electric resistance welding often cannot be applied either, on account of the configuration of one body or on account of its great thickness as compared with the other body.

The main object of my present invention is to afford a method of interconnecting two hollow metallic bodies of the character described, in a heatproof relation without welding, screwing or riveting.

The method disclosed by my present invention shall be explained with the aid of the accompanying drawings, in which—

Figs. 1 and 2 illustrate a tube-to-flange connection according to a first example in vertical section, and Fig. 3 depicts a tube-to-flange assembly according to a second example.

In Fig. 1, the numeral 1 designates a smooth thin-walled tube, which is to be affixed to a tube-assembly flange 2. In accordance with my present invention, a hollow 3 has been milled from the wall of the bore in flange 2. The tube 1 is inserted in the said bore so as to project therefrom a certain distance. The projecting tube end portion is bent over to fit the rounded edge of the bore in flange 2 and thus forms a flange 4.

On the table 5 of a mechanical or hydraulic press or of a conventional spindle press (not shown), is set a circular disk-like abutment 6 on which is supported a disk 7 of a deformable material, for example rubber. A pressure plate 8 acts on the disk 7, which plate is secured to the press punch 9. When the latter descends, the deformable disk 7 exerts a lateral pressure on the wall of tube 1 in the range of hollow 3 so as to force the tube-wall into the latter, as shown in Fig. 2.

When the pressure ceases, i. e. when the punch 9 moves upwardly again, the disk 9 resumes its original shape so as to be readily removable from the tube 1.

The tubewall pressed into the hollow 3 ensures a positive interconnection of the two hollow bodies and the flange 4 may serve as sealing face. In this manner, a stainless steel tube may be directly connected to assembly flanges, and the fluid to be transported in the tube only contacts the latter but not the flanges.

In Fig. 3 is shown a corrugated tube 10 which has been connected to two flanges 11, 12 in the manner described. At the same time, a sleeve 13 and 14 has been secured to each flange and a smooth inside guide-tube 15 co-acts with the said two sleeves. The assembly shown in Fig. 3 may be used as axial compensator in pipe lines. The ends of the corrugated tube 10 are beaded as in the first example.

The deformable disk 7 used for exerting pressure onto the thin-walled tube 1 or 10 and 14 respectively, may be replaced by a body of powdery, granular or pulverulent material, or of plastic.

What I claim as new and desire to secure by Letters Patent, is:

1. A process for joining a tube to a plate which is substantially thicker than the wall of the tube, comprising the steps of forming an outwardly extending annular flange at one end of the tube; placing said tube on the work surface of a press with said flange engaging said work surface and with the rest of said tube extending upwardly from said flange thereof; forming in the plate to be joined to the tube an opening of approximately the same size as the outer diameter of the tube and surrounded by an annular concave surface of the plate; placing said plate on said flange of said tube with the latter extending through said opening of said plate so that said annular concave surface of the plate is directed toward the outer surface of said tube just above said flange thereof; placing a deformable rubber mass, which has in its unstressed condition a thickness substantially equal to the width of said annular concave surface of said plate, completely across the interior of said tube at the elevation of said annular concave surface of said plate; compressing said mass with said press to bulge the wall of said tube uniformly against said annular concave surface of said plate; removing the compressive force from said mass; and removing said mass from the interior of said tube, whereby the latter is joined to said plate at said opening thereof.

2. A process for joining a tube to a plate which is substantially thicker than the wall of the tube, comprising the steps of forming an outwardly extending annular flange at one end of the tube; placing said tube on the work surface of a press with said flange engaging said work surface and with the rest of said tube freely extending upwardly from said flange thereof; forming in the plate to be joined to the tube an opening of approximately the same size as the outer diameter of the tube and surrounded by an annular concave surface of the plate; placing said plate on said flange of said tube with the latter extending through said opening of said plate so that said annular concave surface of the plate is directed toward the outer surface of said tube just above said flange thereof; placing a deformable rubber mass, which has in its unstressed condition a thickness substantially equal to the width of said annular concave surface of said plate, completely across the interior of said tube at the elevation of said annular concave surface of said plate; compressing said mass with said press to bulge the wall of said tube uniformly against said annular concave surface of said plate; removing the compressive force from said mass; and removing said mass from the interior of said tube, whereby the latter is joined to said plate at said opening thereof.

References Cited in the file of this patent

UNITED STATES PATENTS

| Number | Name | Date |
| --- | --- | --- |
| 45,494 | Hawthorn | Dec. 20, 1864 |
| 96,916 | Hisley | Nov. 16, 1869 |
| 560,919 | O'Toole | May 26, 1896 |
| 601,825 | Conners | Apr. 5, 1898 |
| 1,705,622 | Mallory | Mar. 19, 1929 |
| 2,111,695 | Seeber | Mar. 22, 1938 |
| 2,417,202 | Hull | Mar. 11, 1947 |
| 2,460,580 | Huber | Feb. 1, 1949 |
| 2,479,702 | Rood | Aug. 23, 1949 |